July 6, 1965

E. R. BILLINGTON ETAL 3,193,243

CONTROL VALVE SAFETY CLUTCH MECHANISM

Filed July 5, 1962

INVENTORS.
EVANS R. BILLINGTON
SAVIN L. SUNDSTROM
BY

ATTY.

INVENTORS.
EVANS R. BILLINGTON
SAVIN L. SUNDSTROM

ATTY.

United States Patent Office 3,193,243
Patented July 6, 1965

3,193,243
CONTROL VALVE SAFETY CLUTCH
MECHANISM
Evans R. Billington, Lincolnwood, Ill., and Savin L. Sundstrom, Bloomer, Wis., assignors to The Bastian-Blessing Company, Chicago, Ill., a corporation of Illinois
Filed July 5, 1962, Ser. No. 207,747
14 Claims. (Cl. 251—96)

This invention relates in general to control valve structures and in particular to a safety clutch mechanism in conjunction with a hand operated control valve.

It is a primary object of this invention to provide an improved hand operated safety valve construction which prevents inadvertent detrimental valve operation.

It is a specific object of this invention to provide an improved safety clutch mechanism at the handwheel of a hand operated flow control valve which permits valve operation in only one direction when the clutch is engaged and in both directions when the clutch is disengaged.

Another object of this invention is to provide an improved safety clutch mechanism in conjunction with a hand operated flow control valve which is resiliently urged into mating engagement with a rotative valve handle to permit rotation thereof in one direction and may be manually positioned away from the handle to permit rotation of the handle in either direction.

Another object of this invention is to provide an improved safety clutch mechanism adjacent the handwheel of a manually operated control valve permitting rotation of the handwheel in one direction with an audible clicking sound but prevents rotation of the handwheel in the other direction.

A still further object of this invention is to provide an improved safety clutch mechanism resiliently engaging the handwheel of a manually operated control valve permitting rotation of the handwheel in one direction but prevents rotation of the handwheel in the other direction until the clutch mechanism is manually positioned away and held from engagement with the handwheel.

A further object of this invention is to provide an improved safety valve clutch mechanism which is manually engaged in a first position to permit valve handle rotation in one direction and which automatically goes to a secondary position upon rotaiton of the handle in the opposite direction whereby the clutch mechanism must again be manually engaged in the first position before the valve handle can be rotated in the other direction.

Another object of this invention is to provide an improved safety clutch mechanism for a flow control valve which necessitates a willful preliminary manual movement of the clutch mechanism before the valve handle will be free to rotate in either direction.

A further object of this invention is to provide an improved safety clutch mechanism for flow control valves which is simple in construction to prevent inadvertent valve operation which could result in subsequent harmful conditions for the user or equipment to which it is mounted.

The features of the present invention which are believed to be novel are set forth with particularity in the appended claims. The organization and manner of operation of the invention, together with further objects and advantages thereof, may best be understood by a reference to the following description taken in connection with the accompanying drawings, and the several figures of which like reference numerals identify like elements and in which:

By way of generalization for a better understanding of the detailed description to follow, the safety clutch mechanism of this invention is positioned adjacent the handwheel of a flow control valve to prevent accidental or unintentional opening or closing of the valve.

The mechanism provides a spring loaded sleeve just below the wheel handle whereby it may be set or merely slipped to engage or disengage the handle. The sleeve is provided with a plurality of teeth for engagement with teeth on the undersurface of the handwheel. The contour of the mating teeth will vary depending on the nature of the gas or the purpose of the equipment upon which the valve is mounted.

If the valve is to be used with poisonous or explosive gases, the inclination of the mating teeth is directed to prevent accidental opening. In use with breathing or rescue equipment, the inclination of the mating teeth is directed to prevent accidental closing. In both applications, permissible rotations of the handwheel is accompanied by a distinct audible clicking sound which indicates proper valve movement and the number of clicks between the two extreme valve positions gives a measure of the amount or degree of opening of the valve. In the case of therapy or blending application, where the valve setting is not to be disturbed, the sides of the teeth are symmetrical to prevent turning of handwheel in either direction without first disengaging the clutch sleeve.

The clutch mechanism may be further provided, if desired, with a bayonet or lock spline arrangement on the valve and clutch to retain the sleeve in a disengaged position permitting rotation of the handwheel in either direction.

Figure 1:
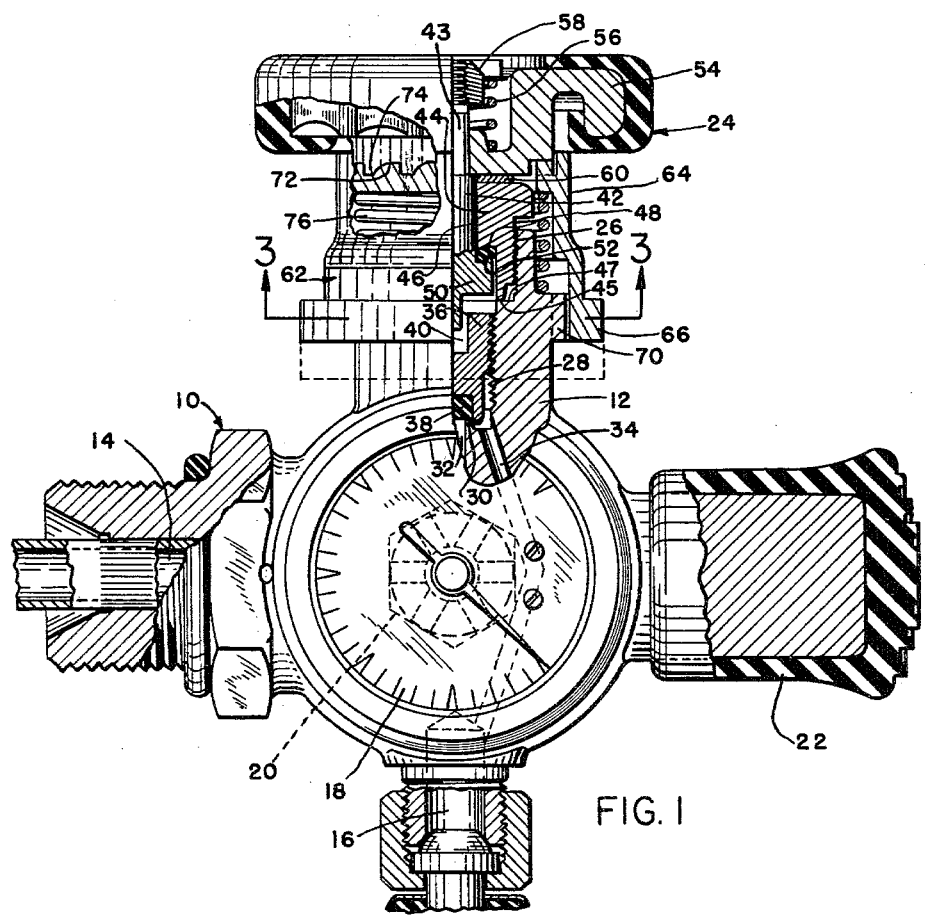
FIG. 1 is a partially sectioned, partially cutaway side elevational view of the valve construction with the safety clutch mechanism of this invention mounted thereon.
Figure 2:
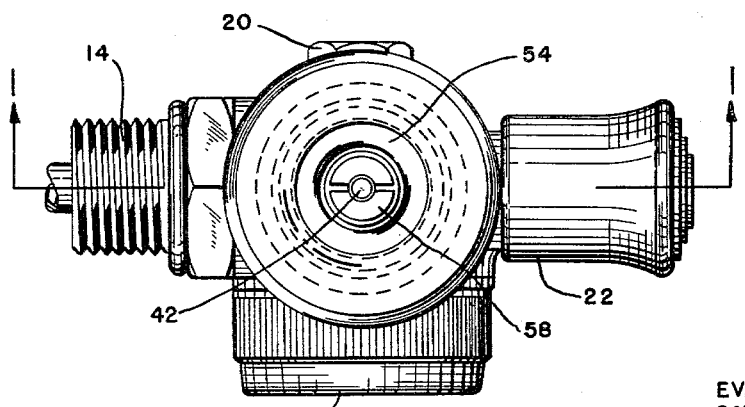
FIG. 2 is a top plan view of the valve construction and safety clutch mechanism.

Referring now to the drawings and more particularly to FIGS. 1 and 2, the safety valve 10 includes a cast body 12 having a pressure inlet port 14 for connection to a supply source, a pressure outlet port 16 for connection to the apparatus to be used, a tank pressure indicator 18, a safety plug assembly 20, and a resilient bumper 22. The body 12 and the formation and geometrical relationship of the components listed above may be of any suitable construction and form no part of this invention; the components being denoted only to clarify the relationship of the safety clutch mechanism of this invention with a hand operated shut off assembly 24 and cooperating related components. Conventionally, the pressure inlet port 14, the pressure indicator 18, safety plug 20 and the shut off assembly 24 are interconnected, with the shut off assembly 24 controlling the flow to the outlet port 16.

The body 12 provides an internally threaded opening 26 on one side in which the shut off assembly 24 is operably received. The opening 26 reduces in diameter as it extends into the body and forms a concentric internally threaded valve chamber 28. The inner end of valve chamber 28 terminates in a concentric valve seat 30 which opens to a flow passage 32 interconnected with the inlet pressure port 14. A flow passage 34 interconnects the valve chamber 28 with the outlet port 16.

A valve head 36 is threadably disposed in the valve chamber 28 and provides a resilient seal member 38, securely recessed in the bottom wall thereof, for sealing engagement with the valve seat 30 when moved to the down or closed position. A slot 40 is formed in the up-upper surface of the valve head in which the lower end of a valve stem 42 is loosely received; permitting rotation of the threaded valve head without linear movement of the stem 42. A bonnet 44 is threadably received in the opening 26, a contoured lower end 45 of the bonnet engages a shoulder 47 formed between the opening 26 and the concentric valve chamber 28 to form a metal to metal seating relationship. Bonnet 44 has an aperture 46 centrally formed therethrough in which the valve stem 42 freely rotates. Adjacent the lower end of the bonnet, the aperture 46 is concentrically enlarged with a seal ring 48 secured therein. The valve stem 42, adjacent the lower end, is enlarged, as at 50, and provides an upward facing peripheral bead 52 for sealing engagement with the lower surface of the seal ring 48.

A wheel handle 54 is received over the upper end of the valve stem 42 and is resiliently secured thereon by a compression spring 56 and handlenut 58 which permits minute reciprocal movement of the handle relative to the valve stem. The upper portion of the stem 42, which engages the handle, has an angular configuration, such as a square 43, which loosely mates with a similar aperture configuration in the handle to interlock the two together; rotation of the handle will rotate the valve stem. A bearing washer 60 is positioned between the handle and the upper surface of the bonnet upon which the lower surface of the handle may ride as it is rotated.

The compression spring 56, disposed between the handlenut 58 on the valve stem and the handle, urges the valve stem 42 upwardly and combines with the fluid pressure acting on the enlarged valve stem portion 50 to force the bead 52 into a leakproof sealing relationship with the seal ring 48. At the same time, the spring 56 is forcing the handle downwardly but permits the handle to reciprocate on the valve stem as the handle is rotated and rides up and over the engaging teeth of the safety clutch mechanism, next to be explained.

Frequently, control valves having a construction similar to that just described, are utilized in conjunction with poisonous or explosive gases; safety and rescue air and gas supplies and blending or therapy equipment.

To prevent inadvertent manipulation of the shut off assembly 24 during use of the valve, a safety clutch mechanism 62 is mounted about the center portion of the shut off assembly.

Figure 3:
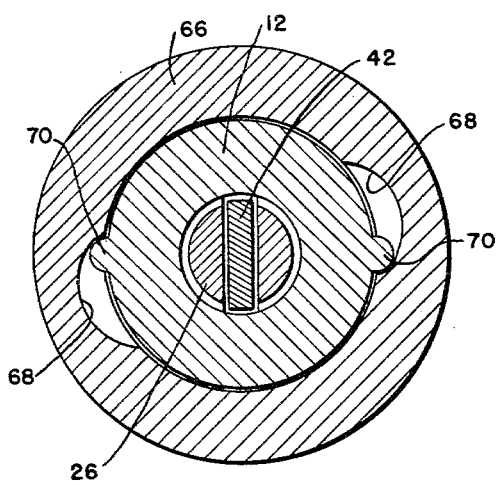
FIG. 3 is a cross sectional view taken along the line 3—3 of FIG. 1.
Figure 4:
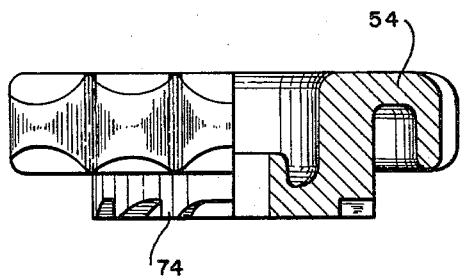
FIG. 4 is a partially sectioned side elevational view of the valve handle.
Figure 5:
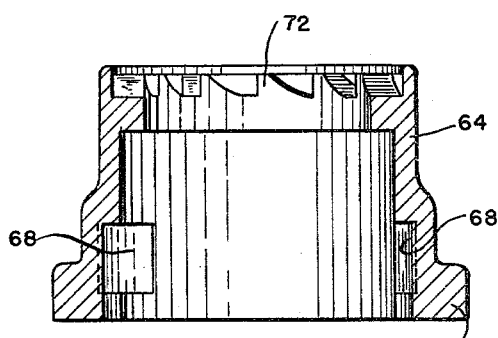
FIG. 5 is a sectional view in side elevation of a reciprocal sleeve of the safety clutch mechanism.

Referring now to FIGS. 1, 3, 4 and 5, a substantially cylindrical clutch sleeve 64 is slidably received over the shut off assembly 24. The lower peripheral portion 66 of the sleeve is enlarged to facilitate gripping of the sleeve with the fingers to engage the clutch mechanism. As best seen in FIGS. 3 and 5, the clutch sleeve is provided with diametrically opposed angular lock slots 68 adjacent to and extending downwardly through the bottom edge of the sleeve. A pair of lugs 70 is formed on the outer surface of the body 12 adjacent the internally threaded aperture 26 and matingly engages the slot 68 in the clutch sleeve. The upper end of the clutch partially telescopes over the lower portion of the handle 54. A plurality of equally spaced buttress teeth 72 are formed on the inner surface of the clutch sleeve adjacent to its upper edge. Mating buttress teeth 74, (FIG. 4), are formed on the under surface of the handle 54 in juxtaposition for engagement with the teeth 72 when the clutch is in the upward engaging position. A compression spring 76 is disposed between the clutch sleeve and the shut off assembly 24, one end of the spring bearing against the body 12 and the other end bearing against the clutch sleeve 64, continuously urges the clutch sleeve upwardly to engage the teeth 72 with the teeth 74 on the handle.

If the clutch sleeve 64 is in the normally upward or engaging position, the handle 54 may be easily rotated counterclockwise to open the valve, the teeth 74 will ride over the teeth 72, the sleeve is depressed against the spring 76 as the mating surfaces of the teeth engage. As the sleeve snaps back after each depression, an audible click is heard further reassuring the operator that rotation is in the proper direction. If the handle is rotated in the clockwise direction the vertical surfaces of teeth 74 will engage the vertical surfaces of teeth 72. Further rotation of the handle in the clockwise direction is prevented since the clutch sleeve is restrained from rotational movement by the lugs 70 engaged in the slots 68.

In order to rotate the handle in the clockwise direction to close the valve, the clutch sleeve 64 must be moved downwardly, against the force of spring 76, until the teeth 72 disengage from the teeth 74. The clutch sleeve may be retained in the downward or disengaged position by turning the sleeve when in the downward position to place the lugs 70 in the horizontal portion of the slots 68. To release the sleeve from the downward locked position, the clutch sleeve is merely slightly turned and the force of the spring 76 will return the sleeve to the up or engaging position when the lugs 70 align with the vertical portion of the slots 68.

Once the valve 10 is set to the desired open position and the clutch sleeve 64 is released to the normally upward engaging position, an operator may open the valve further by rotating the handle but must make the preliminary step of disengaging the sleeve before the valve can be shut off.

Figure 6:
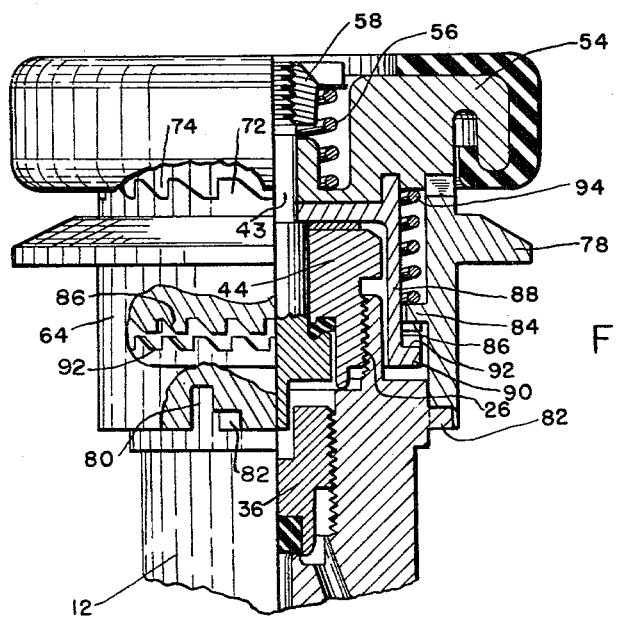
FIG. 6 is a fragmentary partially sectioned, partially cutaway side elevational view of an alternate embodiment of the safety clutch mechanism.

Referring now more particularly to FIGS. 1 and 6, an alternate embodiment of the safety clutch mechanism of this invention is illustrated which automatically returns the clutch sleeve to the engaging position if the operator should inadvertently forget to release the sleeve manually from the disengaged locked position after making an initial open setting of the valve.

The clutch sleeve 64 provides an upper enlarged portion 78 to facilitate manipulation of the clutch sleeve with the fingers. Teeth 72 are formed on the upper end of the sleeve for engagement with mating teeth 74 formed on the under surface of the handle.

The inner surface of the sleeve 64 adjacent the lower edge thereof is notched at spaced intervals to provide L shaped slots 80 for receipt of spaced lugs 82 integrally formed on the cast body 12 adjacent the threaded apertures 26.

A land 84 is formed on the inner surface of the clutch sleeve 64 having equally spaced buttress teeth 86 formed on the under side thereof. A cylindrical collar 88, received over the upper end of the valve stem encircles the bonnet 44 and a portion of the body 12. The collar 88 provides an outwardly extending lip 90 adjacent its lower edge with equally spaced buttress teeth 92 formed on its upper surface in juxtaposition for mating engagement with the teeth 86 on the clutch sleeve.

A compression spring 94, is disposed between the outer surface of the collar 88 and the inner surface of the clutch sleeve 64. One end of the spring 94 seats on the upper surface of the land 84 and the other end engages the under surface of the handle 54 to continuously urge the clutch sleeve in a normally operating downward position.

In operation, the clutch sleeve 64 is resiliently held by spring 94 in a downward position engaging the teeth 86 with the teeth 92 when lug 82 is deep in the L slot 80. When in this downward engaging position, the handle 54 is free at teeth 72–74 to be rotated in the counterclockwise direction to open the valve (FIG. 6), the mating teeth 92 riding over the non-rotating teeth 86 as the sleeve 64 is resiliently moved axially. If the handle 54 is rotated in the clockwise direction, the vertical surfaces of the teeth 86 and 92 will engage preventing rotation since the lugs 82 are engaged in the vertical portion of the L shaped slots 80 preventing sleeve rotation.

To rotate the valve handle 54 in the clockwise direction, the clutch sleeve must be moved upwardly against the force of spring 94 and locked in position by turning the sleeve to permit the lugs 82 to engage the horizontal portion of the L shaped slots 80. When the clutch sleeve 64 is in the upward locked position, the teeth 86 will be disengaged from the teeth 92 but the teeth 72 on the upper edge of the handle will be engaged. The direction of slant of the buttress teeth 72 and 74 is opposite to the direction of slant of the buttress teeth 86 and 92 permitting the handle 54 to be rotated in the clockwise direction. The teeth 74 will ride over the teeth 72, the handle moving upward against the spring 56 as the surfaces of the teeth engage.

If the handle is turned in the counterclockwise direction to open the valve further when the clutch sleeve is in the upward locked position, the vertical surfaces of the teeth 74 will engage the vertical surfaces of the teeth 72 causing the sleeve 64 to be rotated. When the sleeve has been sufficiently rotated, the vertical portion of the slots will align with the lugs 82 and the force of the spring 94 will snap the sleeve downward, disengaging the teeth 72 from the teeth 74 and engaging the teeth 86 with the teeth 92. Thus, normal operating position of the safety clutch sleeve is automatically attained, the handle can be rotated counterclockwise but can not be rotated clockwise. To rotate the handle clockwise, the operator must again manually move the clutch sleeve upwardly to the locked position. Therefore, even if the operator does not reset the clutch sleeve to the normally downward operating position after making an initial valve setting, as the demand for increase of flow begins and the valve handle is rotated counterclockwise, the clutch sleeve will automatically snap into the operating position preventing subsequent closing without again manually resetting the clutch sleeve.

The safety clutch mechanism of this invention has been described relative to inadvertent valve operation in one direction only. It is to be understood that this is by way of example only and not limitation and that the clutch mechanism operates in the exact same manner for protection against inadvertent valve operation in the other direction by reversal of the direction of slant of the buttress teeth. It is further to be understood that if the teeth on the handle and the upper edge of the sleeve had a square or parallel configuration that it would be necessary to disengage the clutch manually for rotation of the handle in either direction.

While particular embodiments of the present invention have been illustrated and described, it would be obvious to those skilled in the art that changes and modifications may be made without departing from the invention and its broader aspects. Accordingly, the aim in the appended claims is to cover all such changes and modifications as fall in the true spirit and scope of the invention.

What is claimed is:

1. In combination with a fluid flow valve body having a rotatable valve stem mounted thereon, a safety clutch mechanism comprising:
   an operating handle secured to the upper end of the valve stem for nonrotative axial movement with respect thereto and providing first engaging means on the under surface thereof,
   a sleeve slidably retained on said valve body against relative movement in one slidable position and having second engaging means on the upper edge thereof, said engaging means comprising ratchet teeth enabling movement in only one direction of rotation,
   means supported on said body to restrict said sleeve against rotation, and
   bias means to effect engagement of the second engaging means on the sleeve with the first engaging means on the handle to prevent rotation of the handle the opposite relative direction of rotation.

2. In combination with a fluid flow valve having a body element and a control valve stem journalled therein and extending therefrom, a safety clutch mechanism comprising:
   an operating handle secured upon said stem for relative axial movement in nonrotative relationship with respect thereto,
   a sleeve element mounted for axial and rotational movement on said body element coaxially with said stem,
   means interengaging said sleeve and body elements for controlling said movement of the sleeve element upon the body element including a stop lug on one of the elements and a circumferentially extending recess portion on the other element having an axial offset portion at one end to receive said stop lug in a relationship locking said elements against relative rotation,
   clutch means interconnecting said handle and sleeve element including ratchet teeth engaging for relative rotation in only one direction of rotation of the handle when said stop lug is located in one of said portions and clearing each other for rotation in the other direction when said stop lug is disposed in the other of said portions,
   means urging said sleeve element axially to dispose said teeth in engagement and said stop lug in other of said portions when coincident therewith, and
   means resiliently urging said handle axially to maintain said teeth in engagement against said relative rotation but yielding to permit relative rotation in said direction therebetween when said stop lug is located in said offset.

3. In combination with a fluid flow valve body having a rotatable valve stem mounted thereon, a safety clutch mechanism comprising:
   an operating handle secured to the upper end of the valve stem providing first engaging means on the under surface thereof,
   a sleeve slidably retained on said valve body having second engaging means on the upper edge thereof,
   means supported on said body to restrict said sleeve against rotation,
   bias means to effect engagement of the second engaging means on the sleeve with the first engaging means on the handle to prevent rotation of the handle, and
   locking means to secure said sleeve in an alternate position with said first and second engaging means disengaged permitting rotation of the handle in either direction.

4. In combination with a fluid flow valve body having a rotatable valve stem mounted thereon, a safety clutch mechanism comprising:
   an operating handle means slidably secured to the upper end of the valve stem and including a clutch element rotatable therewith having a plurality of equally spaced contoured teeth below the under surface of the handle,
   a cylindrical sleeve slidably retained on said valve body having a plurality of equally spaced contoured teeth thereon in engagement with the first mentioned contoured teeth,
   means supported on said body to restrict said sleeve against rotation, and
   a compression spring disposed between said valve stem and said handle means to effect engagement of the teeth on the sleeve with the first mentioned teeth and yielding to permit rotation of the handle in one direction only.

5. In combination with a fluid flow valve body having a rotatable valve stem mounted thereon, a safety clutch mechanism comprising:
   an operating handle slidably secured to the upper end of the valve stem providing a plurality of equally spaced buttress teeth on the under surface thereof,
   a cylindrical sleeve slidably retained on said valve body having a plurality of equally spaced buttress teeth on the upper edge thereof,
   means supported on said body to restrict said sleeve against rotation, and a compression spring disposed between said valve stem and said handle to effect engagement of the teeth on the sleeve with the teeth on the handle to prevent rotation of the handle in one direction.

6. In combination with a fluid flow control valve body having a valve stem extending therefrom, a safety clutch mechanism comprising:

a valve operating handle including a clutch element rotatable therewith having a plurality of equally spaced buttress teeth formed thereon, means to resiliently secure said handle to the upper end of the valve stem, a cylindrical sleeve slidably retained on said valve body having a plurality of equally spaced buttress teeth on a portion thereof in juxtaposition with said teeth on the clutch element, means supported on said body to restrict said sleeve against rotation, bias means to effect engagement of the teeth on said sleeve with the teeth on the clutch element in one position to prevent rotation of the handle in one direction, and locking means to secure said sleeve in an alternate position with said teeth disengaged permitting rotation of the handle in said one direction.

7. In combination with a fluid flow valve body having a rotatable valve stem mounted therein, a safety clutch mechanism comprising:

an operating handle rotating the valve stem and including a first clutch means rotated with said handle along with the valve stem, a manually operated second clutch means mating with the first clutch means supported on the valve body and restricted against rotation, said first and second clutch means cooperating to prevent relative rotation therebetween in one direction when engaged, means supporting said clutch means for movement with respect to each other in a direction axially of the valve stem between one position in which they are engaged and another position in which they are disengaged, bias means urging one of said clutch means towards the other into engagement therewith, said first and second clutch means slipping past each other under the yield of said bias means when rotated relative to each other in the opposite direction, and said second clutch means being movable manually in said axial direction separately from movement of said operating handle to disengage said first and second clutch means for rotation of said handle in said one direction.

8. The combination called for in claim 7 in which said supporting means includes lock means for holding said second clutch means against axial movement away from said first clutch means, and said first clutch means being integrally formed with said handle, said bias means being disposed between said handle and stem.

9. The combination called for in claim 7 including means supporting said first clutch means on the valve stem in axially slidable relation with respect to the handle, lock means on said supporting means to hold said second clutch means against relative axial movement on said body for rotation of said handle and said first clutch means in said opposite direction, and said bias means being disposed between said handle and said valve stem.

10. The combination called for in claim 7 including releasable lock means between said valve body and said second clutch means for supporting said second clutch means against axial movement away from said first clutch means in locked position and releasing said second clutch element for said axial movement to a position disengaging said clutch means when said handle is initially moved in said one direction, and first and second clutch members carried by said handle and said second clutch means engaged against movement of the handle in said opposite direction when said second clutch means is in its released position, second bias means urging said clutch members into engagement with each other, said clutch members slipping past each other under the yield of said second bias means when said handle and second clutch means are rotated relative to each other in said one direction.

11. The combination called for in claim 7 in which said first clutch means includes a plurality of buttress teeth formed on the handle, means slidably securing said handle to the upper end of the stem including a threaded member secured too the stem and a compression spring disposed between the threaded member and the handle, said second clutch means including a cylindrical sleeve slidably retained on said valve having a plurality of buttress teeth formed thereon for mating engagement with the teeth on the handle, angular slots formed in said sleeve, lugs formed on said valve body matingly engaging said slots in the sleeve to prevent rotation of the sleeve when said teeth are in mating engagement, and said biasing means comprising a compression spring disposed between said sleeve and said handle.

12. The combination called for in claim 7 in which said second clutch means includes a sleeve a third clutch means formed on the sleeve, a collar disposed between the valve body and the sleeve, a fourth clutch means formed on said collar in juxtaposition with the third clutch means, bias means urging said sleeve to one position engaging said third clutch means with said fourth clutch means permitting rotation of the handle in only one direction, and locking means to secure said sleeve in an alternate position engaging said second clutch means with said first clutch means to permit rotation of the handle in the other direction.

13. The combination called for in claim 7 in which said first clutch means comprises a first set of teeth formed on the lower surface of the handle thereof, said second clutch means comprises a sleeve having a second set of teeth formed on the upper edge thereof for mating engagement with the first set of teeth on the handle, an internal land integrally formed on said sleeve having a third set of teeth formed on the under surface thereof, a collar received on the valve stem between said valve body and the handle, a lip member extending outwardly from the lower edge of said collar having a fourth set of teeth formed on the upper surface thereof for mating engagement with the third set of teeth on the land, bias means positioned between said sleeve and said collar to effect engagement of said third set of teeth on the land with the fourth set of teeth on the lip of the collar in one position permitting rotation of the handle in only one direction, and locking means to secure said sleeve in an alternate position engaging said second set of teeth with the first set of teeth permitting rotation of the handle in the other direction.

14. The combination called for in claim 7 in which said first clutch means includes buttress teeth formed on a lower surface of said handle, said second clutch means comprises a cylindrical sleeve having a second set of buttress teeth formed on an upper edge thereof for mating engagement with the first set of teeth on the handle, an internal land integrally formed on said sleeve having a third set of buttress teeth formed on the under surface thereof, a cup shaped collar received on the valve stem between said valve and the handle, a lip member integrally formed and extending outwardly from the lower edge of said collar having a fourth set of buttress teeth formed on the upper surface thereof for mating engagement with the third set of teeth on the land, a plurality of contoured slots formed in said sleeve, a plurality of lugs formed on said valve body engaging said slots to prevent sleeve rotation and to secure said sleeve in a locked position, and a second compression spring disposed between said sleeve and said collar, one end of said second spring engaging the under surface of the handle and the other end engaging the upper surface of said land urging said sleeve to one position to effect engagement of said third set of teeth on the land with the fourth set of teeth on the lip of the collar permitting rotation of the handle in one direction, said sleeve being manually movable to an alternate locked position disengaging said third set of teeth from said fourth set of teeth and engaging said second set of teeth with the first set of teeth permitting rotation of the handle in the other direction.

References Cited by the Examiner

UNITED STATES PATENTS 3,054,303  9/62  Maney _____ 251—95 X

FOREIGN PATENTS 84,222  1/58  Denmark.
527,132  10/40  Great Britain.

M. CARY NELSON, *Primary Examiner.*

ISADOR WEIL, *Examiner.*